(12) United States Patent
Walker

(10) Patent No.: US 10,578,479 B2
(45) Date of Patent: Mar. 3, 2020

(54) CALIBRATION BATH WITH ACOUSTIC LIQUID LEVEL SENSOR

(71) Applicant: Fluke Corporation, Everett, WA (US)

(72) Inventor: Richard W. Walker, Alpine, UT (US)

(73) Assignee: Fluke Corporation, Everett, WA (US)

( * ) Notice: Subject to any disclaimer, the term of this patent is extended or adjusted under 35 U.S.C. 154(b) by 240 days.

(21) Appl. No.: 15/673,254

(22) Filed: Aug. 9, 2017

(65) Prior Publication Data

US 2019/0049284 A1 Feb. 14, 2019

(51) Int. Cl.
*G01F 23/296* (2006.01)
*G01K 15/00* (2006.01)

(52) U.S. Cl.
CPC ......... *G01F 23/296* (2013.01); *G01K 15/002* (2013.01); *G01K 15/005* (2013.01); *G01F 23/2962* (2013.01)

(58) Field of Classification Search
CPC . G01F 23/296; G01F 23/2962; G01K 15/002; G01K 15/005
See application file for complete search history.

(56) References Cited

U.S. PATENT DOCUMENTS

| | | | |
|---|---|---|---|
| 4,545,245 A | 10/1985 | Sharp | |
| 4,909,080 A | 3/1990 | Kikuta et al. | |
| 5,062,295 A * | 11/1991 | Shakkottai | G01F 23/2962 340/621 |
| 5,119,676 A * | 6/1992 | Bower | G01F 23/2962 181/124 |
| 5,226,320 A * | 7/1993 | Dages | G01F 23/2962 181/124 |
| 5,483,501 A * | 1/1996 | Park | B06B 1/0688 367/140 |

(Continued)

FOREIGN PATENT DOCUMENTS

CN 105675172 A 6/2016
FR 1329765 A 6/1963

OTHER PUBLICATIONS

Machine translation of CN 105675172 A (Year: 2016).*

(Continued)

*Primary Examiner* — David J Bolduc
(74) *Attorney, Agent, or Firm* — Seed Intellectual Property Law Group LLP

(57) ABSTRACT

Systems and methods that provide measurement of liquid levels in a container, such as a calibration bath container, may utilize an acoustic transducer subsystem that includes one or more acoustic transducers that are controlled by a controller. The acoustic transducer subsystem emits acoustic signals toward a surface of a liquid in a container, and detects reflected acoustic signals that are reflected from the surface of the liquid. The liquid level sensor utilizes an acoustic waveguide subsystem to allow the acoustic transducer subsystem to be spaced apart from the liquid, which protects the acoustic transducer system another other components from damage due to heat, liquid, and vapor. The acoustic waveguide subsystem also channels the emitted and reflected acoustic signals to prevent substantial scattering of the signals within the container, which greatly improves the accuracy of the liquid level sensor.

25 Claims, 7 Drawing Sheets

(56) References Cited

U.S. PATENT DOCUMENTS

| | | | | |
|---|---|---|---|---|
| 5,765,433 | A * | 6/1998 | Johnson | G01F 17/00 |
| | | | | 73/290 V |
| 5,822,274 | A * | 10/1998 | Haynie | G01F 23/2962 |
| | | | | 367/99 |
| 7,418,860 | B2 | 9/2008 | Austerlitz et al. | |
| 2004/0007061 | A1 * | 1/2004 | Forgue | G01F 23/2962 |
| | | | | 73/290 V |
| 2004/0182149 | A1 * | 9/2004 | Balin | G01F 23/2962 |
| | | | | 73/290 V |
| 2005/0072226 | A1 * | 4/2005 | Pappas | G01F 23/2962 |
| | | | | 73/290 V |
| 2006/0169055 | A1 * | 8/2006 | Agam | B65D 90/48 |
| | | | | 73/861.23 |
| 2007/0204689 | A1 * | 9/2007 | Bostrom | G01F 23/2962 |
| | | | | 73/290 V |
| 2011/0094299 | A1 * | 4/2011 | Muller | G01F 23/0076 |
| | | | | 73/290 V |
| 2012/0132658 | A1 * | 5/2012 | Dans | G01K 1/14 |
| | | | | 220/592.2 |
| 2012/0239316 | A1 * | 9/2012 | Foote | G01F 23/0061 |
| | | | | 702/55 |
| 2012/0265486 | A1 * | 10/2012 | Klofer | G01F 23/0061 |
| | | | | 702/166 |
| 2016/0274234 | A1 * | 9/2016 | Nawrocki | G01S 15/88 |

OTHER PUBLICATIONS

Machine translation of FR 1329765 A (Year: 1963).*
European Search Report, dated Jan. 7, 2019, for European Application No. 18188020.4-1001, 11 pages.
Whitehead, "PGA460 Ultrasonic Module Hardware and Software Optimization," Application Report SLAA732, Feb. 2017, URL= http://www.ti.com/lit/an/slaa732/slaa732.pdf, 15 pages.
European Examination Report for EP application No. 18188020.4, dated Aug. 30, 2019, 6 pages.
Julabo Gmbh, "Operating Manual: Refrigerated and Heating Circulators—F12-EH, F25-EH, F32-EH, F33-EH, F34-EH", Jul. 11, 2013, retrieved from <https://www.julabo.com/sites/default/files/downloads/manuals/english/19510253-V2.pdf>.
Peter Huber Kaltemaschinenbau Gmbh, "Operating Instructions: ministat 125/w, ministat 230/2, ministat 240/w", Nov. 1, 2003, retrieved from <http://www.huber-online.com/download/manuals/archive/Ministat_125_230_240_V2.2-07_EN.

* cited by examiner

CALIBRATION BATH WITH ACOUSTIC LIQUID LEVEL SENSOR

BACKGROUND

Technical Field

The present disclosure generally relates to sensors that utilize acoustic signals to determine a level of a liquid in a container, such as a calibration bath container.

Description of the Related Art

A calibration bath container, or "calibration bath," is commonly used in the calibration of temperature transducers and other types of temperature sensors. Typically, a calibration bath includes a tank or container filled with a liquid that is temperature controlled by one or more heaters and/or cooling assemblies. For optimal performance and safety, it can be important that the liquid in the calibration bath container be maintained at a proper level. A liquid level sensor would be useful for this purpose. However, for many applications, the temperature of the liquid in the calibration bath may be very high (e.g., 500° C. or higher). Such high temperatures preclude use of many types of available liquid level sensing technologies. As a result, most calibration baths do not have a liquid level sensor. Instead, an operator is required to visually check the bath fluid regularly to ensure the liquid is at the proper level. Failure to monitor the liquid level can lead to poor calibration results or even safety concerns. For example, if there is insufficient fluid in the calibration bath, heated parts of the calibration bath container can reach excessive temperatures. To help prevent damage to the calibration bath or materials, the equipment may need to be fitted with a cut-out device that disables the heaters if the heaters become too hot.

Previous calibration baths that have had a liquid level sensor have used a float-type liquid level sensor. There are practical limitations to such types of sensors. For example, such sensors can only be used in applications that utilize moderate temperature ranges. Additionally, float-type liquid level sensors are troublesome to clean and maintain, and are difficult to ensure reliability over time.

BRIEF SUMMARY

In at least some implementations, a liquid level sensor positionable with respect to a calibration bath container that holds a quantity of a liquid may be summarized as including: an acoustic waveguide subsystem comprising a sidewall that forms at least one elongated channel between a first end and a second end, the second end comprising at least one opening that faces toward the liquid in the calibration bath container; an acoustic transducer subsystem disposed proximate the first end of the acoustic waveguide subsystem, the acoustic transducer subsystem operative to transmit and detect acoustic signals via the acoustic waveguide subsystem; at least one nontransitory processor-readable storage medium that stores at least one of processor-executable instructions or data; and at least one processor communicatively coupled to the acoustic transducer subsystem and the at least one nontransitory processor-readable storage medium, wherein in operation, the at least one processor: causes the acoustic transducer subsystem to transmit an acoustic signal; causes the acoustic transducer subsystem to detect a reflected acoustic signal, the reflected acoustic signal being reflected from a surface of the liquid in the calibration bath container; receives a signal representative of the reflected acoustic signal; and determines a liquid parameter associated with an amount of the liquid in the calibration bath container based at least in part on a characteristic of the reflected acoustic signal.

The acoustic waveguide subsystem may include a single waveguide, and the acoustic transducer subsystem may include a transmit/receive transducer disposed proximate the first end of the acoustic waveguide subsystem, wherein in operation the transmit/receive transducer transmits and detects acoustic signals via the waveguide. The liquid level sensor may include a switch operatively coupled to the transmit/receive transducer, wherein in operation the switch alternatively couples the transmit/receive transducer to transmit circuitry or receive circuitry of the liquid level sensor, and wherein, in operation, the at least one processor controls the switch to couple the transmit/receive transducer to the transmit circuitry during a transmit phase in which the transmit/receive transducer transmits acoustic signals, and controls the switch to couple the transmit/receive transducer to the receive circuitry during a receive phase in which the transmit/receive transducer receives acoustic signals. The liquid level sensor may include a resistive load continuously or selectively coupled to the transmit/receive transducer. In operation, the at least one processor may cause delivery of a dampening pulse signal to the transmit/receive transducer between the transmit phase and the receive phase, the dampening pulse signal being out of phase with the pulse signal delivered to the transmit/receive transducer during the transmit phase. The second end of the acoustic waveguide subsystem may be submerged in the liquid in the calibration bath container when the liquid is within an intended range of levels.

In at least some implementations, the second end of the acoustic waveguide subsystem may be spaced apart from the liquid in the calibration bath container by between 1 centimeter and 50 centimeters when the liquid is within an intended range of levels, for example.

The acoustic waveguide subsystem may include a transmit waveguide and a receive waveguide, each of the transmit waveguide and receive waveguide including respective first and second ends, the second ends each including an opening that faces toward the liquid in the calibration bath container, and the acoustic transducer subsystem may include a transmit transducer and a receive transducer, the transmit transducer disposed proximate the first end of the transmit waveguide, and the receive transducer disposed proximate the first end of the receive waveguide. The transmit waveguide and the receive waveguide may be positioned substantially adjacent one another. The at least one elongated channel of the acoustic waveguide subsystem may have at least one curved portion. The acoustic waveguide subsystem may be formed from at least one of stainless steel, titanium, or polyvinyl chloride. The at least one elongated channel of the acoustic waveguide subsystem may have a length that is between 5 centimeters and 25 centimeters, for example. The elongated channel may have a cross-sectional area that is between 15 square millimeters and 150 square millimeters, for example.

The transmitted acoustic signal may result from a driving pulse signal including a number of cycles of at least one of a square wave, a triangle wave, or a sine wave. The liquid parameter may include at least one of: a depth of the liquid in the calibration bath container, a volume of the liquid in the calibration bath container, or a distance between the liquid level sensor and the surface of the liquid in the calibration bath container, for example. The characteristic of the reflected acoustic signal may include an elapsed travel time between when the acoustic signal is transmitted and when the reflected acoustic signal is detected.

The liquid level sensor may further include an auxiliary sensor operatively coupled to the at least one processor, wherein in operation, the at least one processor receives an auxiliary sensor signal from the auxiliary sensor and determines the liquid parameter based at least in part on the received auxiliary sensor signal. The auxiliary sensor may include at least one of a temperature sensor or a pressure sensor.

The liquid level sensor may further include a user interface operatively coupled to the at least one processor, wherein in operation, the at least one processor causes the user interface to provide an indication associated with the determined liquid parameter. The liquid level sensor may further include a communications interface operatively coupled to the at least one processor, wherein in operation, the at least one processor causes the communications interface to send information associated with the determined liquid parameter to a separate processor-based device.

At least a portion of the sidewall of the acoustic waveguide subsystem may be positionable outside of the calibration bath container during use. The at least one processor may be positionable outside of the calibration bath container during use. The acoustic transducer subsystem may be positionable outside of the calibration bath container during use.

In at least some implementations, a sensor calibration system may be summarized as including: a calibration bath container sized and dimensioned to hold a quantity of a liquid; a liquid level sensor positionable with respect to the calibration bath container, the liquid level sensor including: an acoustic waveguide subsystem including a sidewall that forms at least one elongated channel between a first end and a second end, the second end including at least one opening that faces toward the liquid in the calibration bath container; an acoustic transducer subsystem disposed proximate the first end of the acoustic waveguide subsystem, the acoustic transducer subsystem operative to transmit and detect acoustic signals via the acoustic waveguide subsystem; and control circuitry communicatively coupled to the acoustic transducer subsystem that. In operation, the control circuitry: causes the acoustic transducer subsystem to transmit an acoustic signal; causes the acoustic transducer subsystem to detect a reflected acoustic signal, the reflected acoustic signal reflected from a surface of the liquid in the calibration bath container; receives a signal representative of the reflected acoustic signal; and determines a liquid parameter associated with an amount of the liquid in the calibration bath container based at least in part on a characteristic of the reflected acoustic signal.

In at least some implementations, a method of operating a sensor calibration system may be summarized as including: positioning a liquid level sensor proximate a calibration bath container that holds a quantity of a liquid. The liquid level sensor may include: an acoustic waveguide subsystem including a sidewall that forms at least one elongated channel between a first end and a second end, the second end including at least one opening that faces toward the liquid in the calibration bath container; and an acoustic transducer subsystem disposed proximate the first end of the acoustic waveguide subsystem, the acoustic transducer subsystem operative to transmit and detect acoustic signals via the acoustic waveguide subsystem. The method may further include: causing, by at least one processor, the acoustic transducer subsystem to transmit an acoustic signal; causing, by the at least one processor, the acoustic transducer subsystem to detect a reflected acoustic signal, the reflected acoustic signal reflected from a surface of the liquid in the calibration bath container; receiving, by the at least one processor, a signal representative of the reflected acoustic signal; and determining, by the at least one processor, a liquid parameter associated with an amount of the liquid in the calibration bath container based at least in part on a characteristic of the reflected acoustic signal.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

One or more implementations of the present disclosure are directed to systems and methods of sensing a liquid level in a calibration bath using at least one acoustic (e.g., ultrasonic) transducer. Unique features of the implementations described herein allow the liquid level sensor, and various components associated therewith, to be located some distance from the bath liquid where the liquid level sensor is not affected by extreme temperatures, splashing liquid, or vapor. Such systems and methods provide a safer and more convenient solution that preemptively warns an operator in instances where the liquid level of a calibration bath is too low. In at least some implementations, the liquid level sensor may be operative to disable or modify operation of the calibration bath if the liquid level is too low. Solutions of the present disclosure provide greater convenience, broader temperature range capabilities, lower cost, and better reliability than presently available solutions.

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

Figure 1:
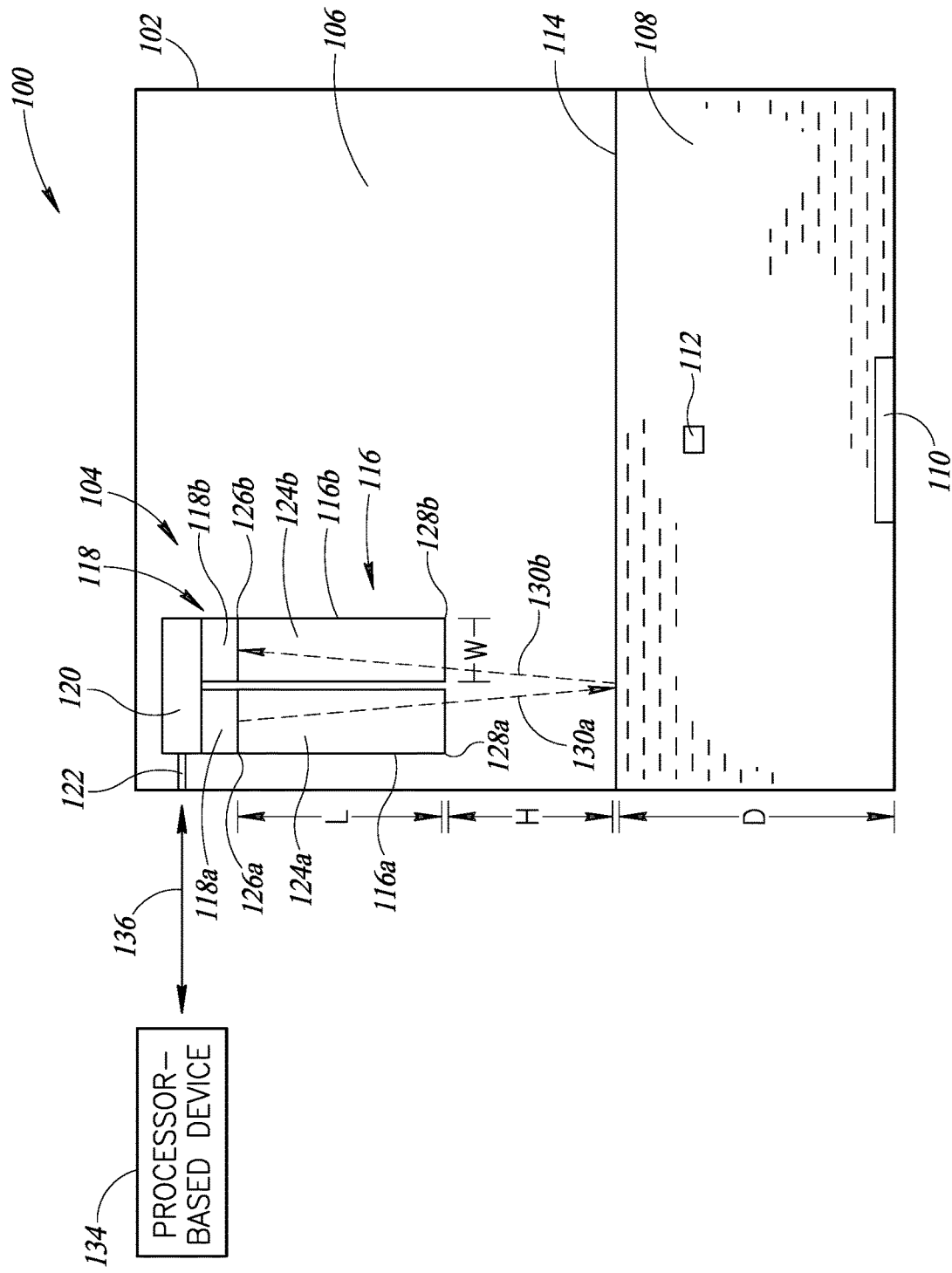
FIG. 1 is an elevational view of a sensor calibration system that includes a calibration bath container and an acoustic liquid level sensor that includes a transmit acoustic transducer and a receive acoustic transducer, according to one illustrated implementation.

FIG. 1 shows a sensor calibration system 100 that includes a calibration bath container 102 and an acoustic liquid level sensor 104. The calibration bath container 102 includes an interior volume 106 that holds a quantity of a liquid 108 and a heater 110 that may be controlled to heat the liquid to a desired temperature. The liquid 108 may have a depth D. In operation, one or more sensors 112 (e.g., temperature transducers) may be placed in the bath liquid 108 when the liquid is heated to a known temperature to calibrate or otherwise test the operation of the one or more sensors.

At least a portion of the liquid level sensor 104 may be positioned within at least a portion of the interior volume 106 of the calibration bath container 102 above a liquid surface 114 of the liquid 108 in the calibration bath container. The liquid level sensor 104 includes an acoustic waveguide subsystem 116, an acoustic transducer subsystem 118, and a housing 120 that contains various components discussed further below with reference to FIG. 2.

In the illustrated example, the housing 120 of the liquid level sensor 104 is fixedly or removably attached to a surface of the calibration bath container 102 by one or more suitable fasteners 122 (e.g., bracket, clamp, bolt). In at least some implementations, the liquid level sensor 104 may be integrated with the calibration bath container 102. In at least some implementations, the liquid level sensor 104 may be separate from the calibration bath container 102 such that the liquid level sensor may be used with numerous calibration bath containers having similar or different shapes and sizes.

The acoustic waveguide subsystem 116 includes a transmit waveguide 116a and a receive waveguide 116b (collectively "waveguides 116"). The transmit waveguide 116a comprises a continuous sidewall having a length L that forms an elongated hollow channel 124a between a first end 126a and a second end 128a, the second end 128a including an opening that faces downward toward the liquid 108 in the calibration bath container 102. Similarly, the receive waveguide 116b comprises a continuous sidewall having a length L that forms an elongated hollow channel 124b between a first end 126b and a second end 128b, the second end 128b including an opening that faces downward toward the liquid 108 in the calibration bath container 102.

The second ends 128a and 128b of the waveguides 116a and 116b, respectively, are spaced apart from the surface 114 of the liquid 108 by a height H, which varies dependent on the depth D of the liquid. In at least some implementations, the mounting position of the liquid level sensor 104 and/or the length L of the waveguides 116 are designed such that the second ends 128a and 128b are positioned between 1 cm and 50 cm from the surface 114 of the liquid 108 for the intended range of the depth D of the liquid, for example. In at least some implementations, the waveguides 116 may each have a length L that is between 5 cm and 25 cm (e.g., 10 cm, 20 cm). In the illustrated example, the waveguides 116 are positioned substantially adjacent each other (e.g., spaced apart by 0.1 cm, or in contact with each other), but in other implementations the waveguides may be spaced farther apart from each other. As discussed further below, the waveguides 116 may be formed into various shapes and sizes. Further, the shape and size of the transmit waveguide 116a may the same as or different from the shape and size of the receive waveguide 116b.

Each of the waveguides may have a width dimension W that is selectable based on the particular application. As a non-limiting example, in at least some implementations, each of the waveguides 116 has an interior wall having a circular cross-section with a diameter that is between 0.2 cm and 2.5 cm (e.g., 0.6 cm). In at least some implementations, each of the waveguides 116 forms an elongated channel having a cross-sectional area that is between 15 square millimeters and 150 square millimeters, for example. The cross-sectional shape of the waveguides 116 may be any suitable shape (e.g., hexagonal, pentagonal, rectangular, triangular, circular, irregular shape). Further, the waveguides 116 may be formed from any suitable material, such as stainless steel, titanium, polyvinyl chloride (PVC), etc., or other suitable material. In at least some implementations, the waveguides 116 are formed from any material that is resistant to temperature, liquid, or vapor, and does not significantly dampen acoustic signals that traverse the waveguides.

In this illustrated implementation, the acoustic transducer subsystem 118 of the liquid level sensor 104 includes a transmit (TX) transducer 118a positioned at the first end 126a of the transmit waveguide 116a, and a receive (RX) transducer 118b positioned at the first end 126b of the receive waveguide 116b. The transmit transducer 118a is operative to transmit acoustic signals, indicated by dashed arrow 130a, through the transmit waveguide 116a of the acoustic waveguide subsystem 116, and the receive transducer 118b is able to receive or otherwise detect reflected acoustic signals, indicated by dashed arrow 130b propagated through the receive waveguide 116b after reflection from the surface 114 of the liquid 108. The transducers 118a and 118b may be piezoelectric transducers or other suitable types of acoustic transducers.

As discussed further below with reference to FIG. 2, the housing 120 of the liquid level sensor 104 includes a controller 132 (FIG. 2) and other components that facilitate operation of the liquid level sensor. Generally, the controller 132 may include at least one processor communicatively coupled to the acoustic transducer subsystem 118 and to at least one nontransitory processor-readable storage medium that stores at least one of processor-executable instructions or data. The controller 132 may include any type of processing unit, such as one or more central processing units (CPUs), digital signal processors (DSPs), application-specific integrated circuits (ASICs), field programmable gate arrays (FPGAs), programmable logic controllers (PLCs), artificial neural network circuits or systems, or any other discrete or integrated logic components. The nontransitory processor-readable storage medium coupled to the controller 132 may include any type of nontransitory volatile and/or non-volatile memory.

Under direction of the controller 132, in operation, the transmit transducer 118a may transmit acoustic signals 130a during a transmit phase, and during a receive phase the receive transducer 118b may detect reflected acoustic signals 130b that are reflected from the surface 114 of the liquid 108 in the calibration bath container 102. The controller 132 may receive a signal (e.g., digital signal, analog signal) representative of the reflected acoustic signal 130b, and may determine a liquid parameter (e.g., surface level, depth, volume) associated with the amount of the liquid 108 in the calibration bath container 102 based at least in part on a characteristic (e.g., elapsed time of flight) of the transmitted and reflected acoustic signal. For example, the controller 132 may determine the elapsed time between transmitting the acoustic signal and detecting the reflected acoustic signal. Such information may be used along with the known speed of sound through air to determine the distance between the liquid level sensor 104 and the surface 114 of the liquid 108. This determined distance may also be used to determine the depth D of the liquid 108 given a known positioning of the acoustic transducers 118a, 118b relative to the bottom of the calibration bath container 102. The detection cycle, which includes the transmit phase and the receive phase, may be repeated periodically (e.g., every 100 ms, every 1 second, every 10 seconds, every minute, every 10 minutes) during the normal operation of the liquid level sensor.

As discussed further below, the determined liquid parameter (e.g., surface level, depth, volume) may be used to monitor the conditions of the liquid 108, and to provide signals that may be used to notify an operator of the sensor calibration system 100 of liquid levels that are outside a range of acceptable liquid levels, or to modify the operation of the sensor calibration system 100. Such operational modification may include disabling or modifying the operation of the heater 110, causing liquid to be added to or removed from the container 102, etc.

As shown in FIG. 1, the transducers 118a and 118b are located a distance (L+H) from the surface 114 of the liquid 108, which advantageously avoids potential damage to the transducers that may otherwise be caused by heat, liquid, or vapor. By providing the waveguide subsystem 116 as described above, the acoustic signals 130a transmitted by the transmit transducer 118a are directed toward the surface 114 of the bath liquid 108 through the transmit waveguide 116a, and the reflected signals 130b are guided through the receive waveguide 116b to the receive transducer 118b. This feature greatly increases the sensitivity and accuracy of the liquid level sensor 104 by not allowing the acoustic signals 130a and 130b to scatter throughout the interior volume 106 of the calibration bath container 102, while allowing the transducers 118a and 118b to be spaced apart from the liquid 108.

In at least some implementations, the liquid level sensor 104 may be communicatively coupled to an external processor-based device 134 via one or more wired and/or wireless communications channels 136. The external processor-based device 134 may be any of a number of devices, such as a server, cloud-based system, smartphone, tablet computer, laptop computer, wearable computer, etc. Non-limiting examples of wireless communications technologies include Wi-Fi®, Bluetooth®, Bluetooth® Low Energy, Zigbee®, 6LoWPAN®, Optical IR, wireless HART, etc. Non-limiting examples of wired communications technologies include USB®, Ethernet, PLC, HART, MODBUS, FireWire®, Thunderbolt®, etc. Examples of the signals or data that may be communicated to/from the external device 134 include, but are not limited to, liquid parameters (e.g., surface level, depth, volume), control instructions or data, firmware, historical data, etc.

Figure 9:
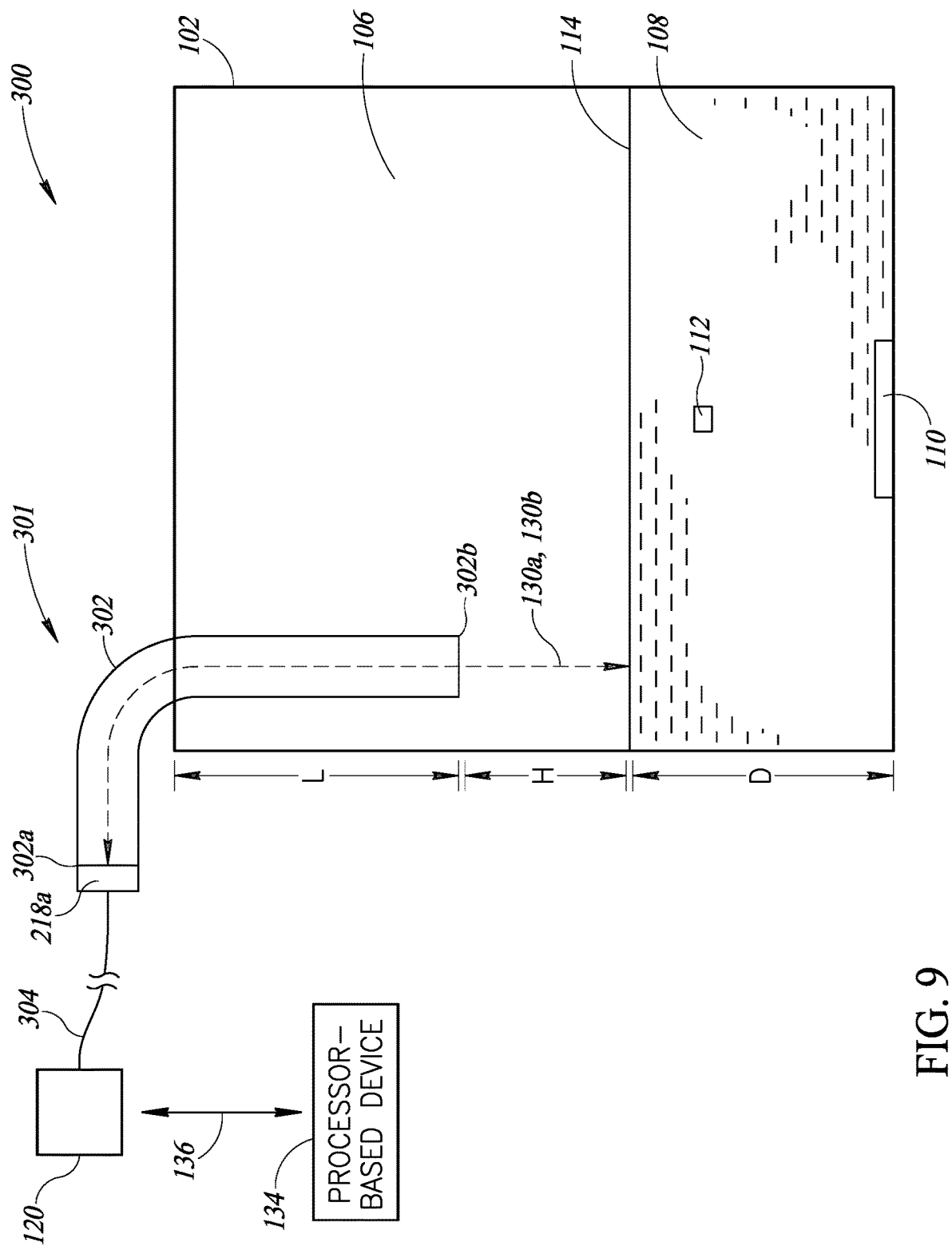
FIG. 9 is an elevational view of a sensor calibration system that includes a calibration bath container and an acoustic liquid level sensor, wherein the liquid level sensor includes a waveguide that extends outside of the calibration bath container, according to one illustrated implementation.

Although in the example shown in FIG. 1 the liquid level sensor 104 is shown as being positioned fully inside the container 102, in many implementations a portion of the waveguides 116 may extend outside the container, and the acoustic transducers 118 are also positioned outside of the container where they may be less affected by heat, vapor, etc. Further, in at least some implementations, the controller 132 and/or other components may be physically separated from the transducers 118 by a distance and communicatively coupled to the transducers via a suitable connection (e.g., wires, wireless connection). FIG. 9 shows a non-limiting example of such an implementation. It should be appreciated that the various examples discussed herein may include one or more components (e.g., transducers, electronics, housing, portion of a waveguide) that are positionable outside of the container 102 during operation of the liquid level sensor.

Figure 2:
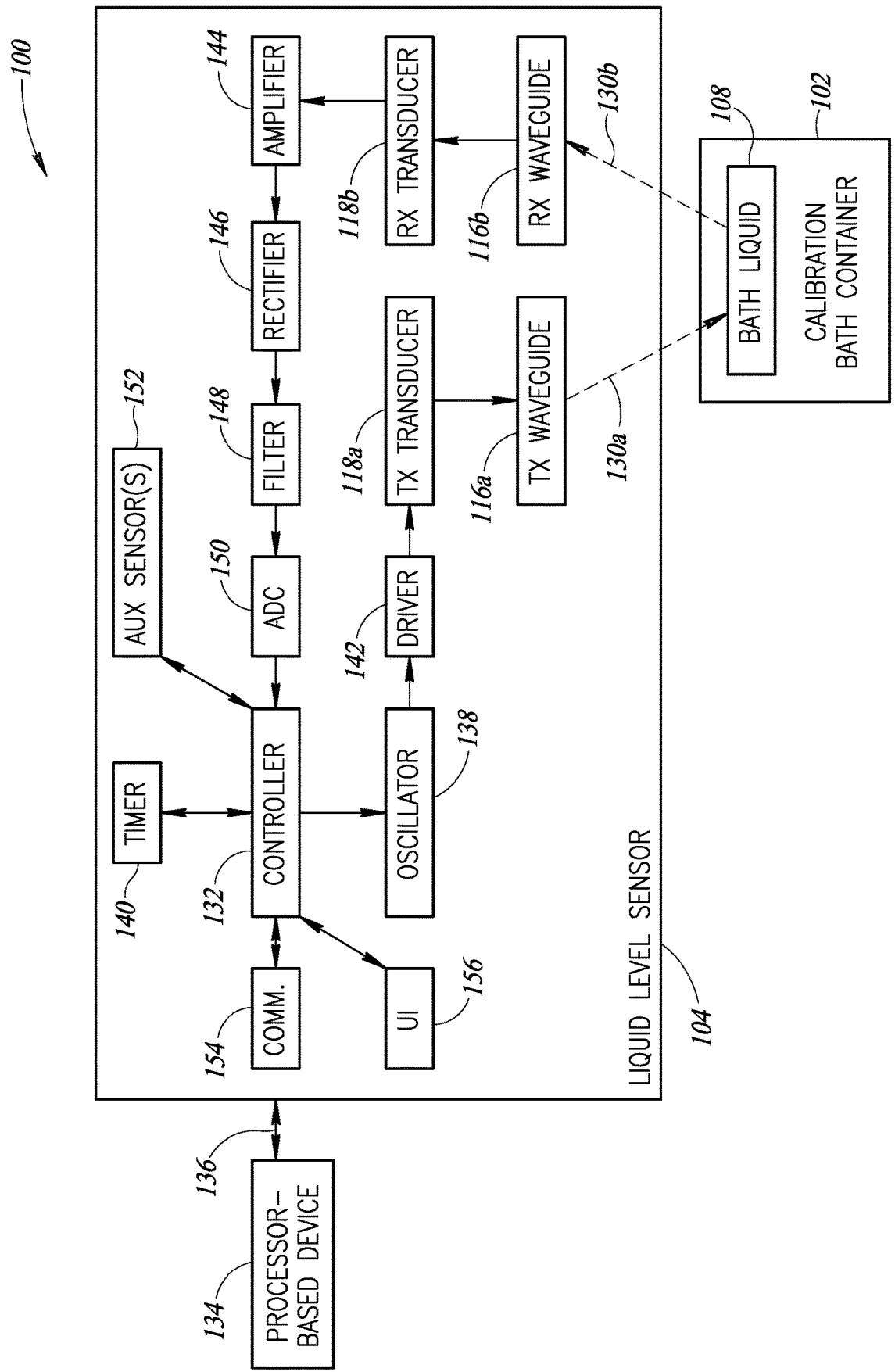
FIG. 2 is a schematic block diagram of the sensor calibration system of FIG. 1, according to one illustrated implementation.

FIG. 2 shows a schematic block diagram of the sensor calibration system 100 shown in FIG. 1. As noted above, operation of the liquid level sensor 104 is controlled by the controller 132. During a transmit phase, the controller 132 may turn on an oscillator 138 for a brief period of time. At the same time, the controller 132 may start a timer 140 so the controller can measure the time elapsed between when an acoustic signal is transmitted and when a reflected acoustic signal is detected. The oscillator 138 produces a short-duration, high frequency electronic signal. The signal may be amplified by a driver circuit 142 to increase the power level to a level suitable to operate the transmit transducer 118a. The amplified signal is then applied to the transmit transducer 118a, which causes the transmit transducer to vibrate and produce a pulse of high frequency sound. The sound is channeled toward the liquid 108 through the transmit waveguide 116a that is coupled to the transmit transducer 118a.

During a receive phase, the acoustic signals reflect off of the surface of the bath liquid 108 and travel back through the receive waveguide 116b that is coupled to the receive transducer 118b. The reflected acoustic signals vibrate the receive transducer 118b, causing the receive transducer to produce an electronic signal. In the illustrated implementation, the electronic signal is amplified by an amplifier circuit 144, rectified by a rectifier circuit 146, and smoothed by a filter circuit 148. The conditioned signal is fed to an analog-to-digital converter (ADC) 150. Digital samples from the ADC 150 are received by the controller 132 and associated with time stamps obtained by the controller from the timer 140.

The controller 132 analyzes the data to determine the time elapsed from when the acoustic signals were transmitted and when the reflected acoustic signals were received. Then, using a known calculation or mathematical formula that takes into account the speed of sound, the controller 132 determines the distance between the transducers 118 and the surface 114 of the liquid 108. From the determined distance and the known positioning of the liquid level sensor 104 relative to the calibration bath container 102, the controller 132 can determine the depth D (see FIG. 1) of the bath liquid 108. In at least some implementations, the liquid level sensor 104 may include one or more auxiliary sensors 152, such as a temperature sensor or a pressure sensor. The speed of sound varies dependent on the temperature and pressure of the air. In some implementations, the controller 132 may receive signals from the one or more auxiliary sensors, and may account for the effect of various environmental factors (e.g., temperature, pressure) on the speed of sound when determining the liquid parameter (e.g., surface level, depth, volume) associated with the amount of liquid 108 in the container 102. This feature ensures accurate measurements even in varying environmental conditions.

In at least some implementations, the liquid level sensor 104 may optionally include a communications interface 154 or a user interface 156. The user interface 156 may facilitate user interaction with the liquid level sensor 104. The user interface 156 may include any number of inputs (e.g., buttons, dials, switches, touch sensor) and any number of outputs (e.g., display, LEDs, speakers, buzzers). For example, the user interface may include inputs that allow an operator to modify one or more adjustable settings of the liquid level sensor 104. Such settings may include, for example, acceptable depths for the liquid, acceptable volume of the liquid, acceptable distances between the liquid level sensor and the surface of the liquid, display settings, communications settings, etc. The communications interface 154 may implement one or more wired and/or wireless communications technologies (e.g., USB, Bluetooth®) that allow the controller 132 to communicate with one or more external processor-based devices, such as the illustrated processor-based device 134, via one or more communications channels 136.

After the controller 132 has determined the liquid parameter, such information may be presented to an operator or provided to a device for monitoring or control purposes. For example, the information may be presented to an operator via a display of the user interface 156 of the liquid level sensor 104, or may be sent via the communication interface 154 to a device that includes a display. As another example, such information may be sent to a monitoring system that is operative to notify an operator when the level of the liquid 108 is determined to be outside a determined range of levels. In at least some implementations, the information may be used by the liquid level sensor 104 or another system to modify the operation of the sensor calibration system 100 by, for example, disabling or changing the operation of the heater 110 of the calibration bath container 102.

As an example, the liquid level sensor 104 may be configured to define a liquid level depth range of between 5 and 50 centimeters, dependent on the sizes and dimensions of the container. For example, for a particular medium sized calibration bath, the acceptable range may be between 25 and 30 centimeters, below which range the acoustic liquid level sensor may trigger a warning or other action. The sensor 104 may periodically (e.g., every second, every minute, every hour) obtain a depth measurement and compare the depth measurement to the defined range. Responsive to detecting that the measured depth is outside the range, the liquid level sensor 104 may cause any number of notification and/or control actions to be implemented, as discussed elsewhere herein.

Figure 3:
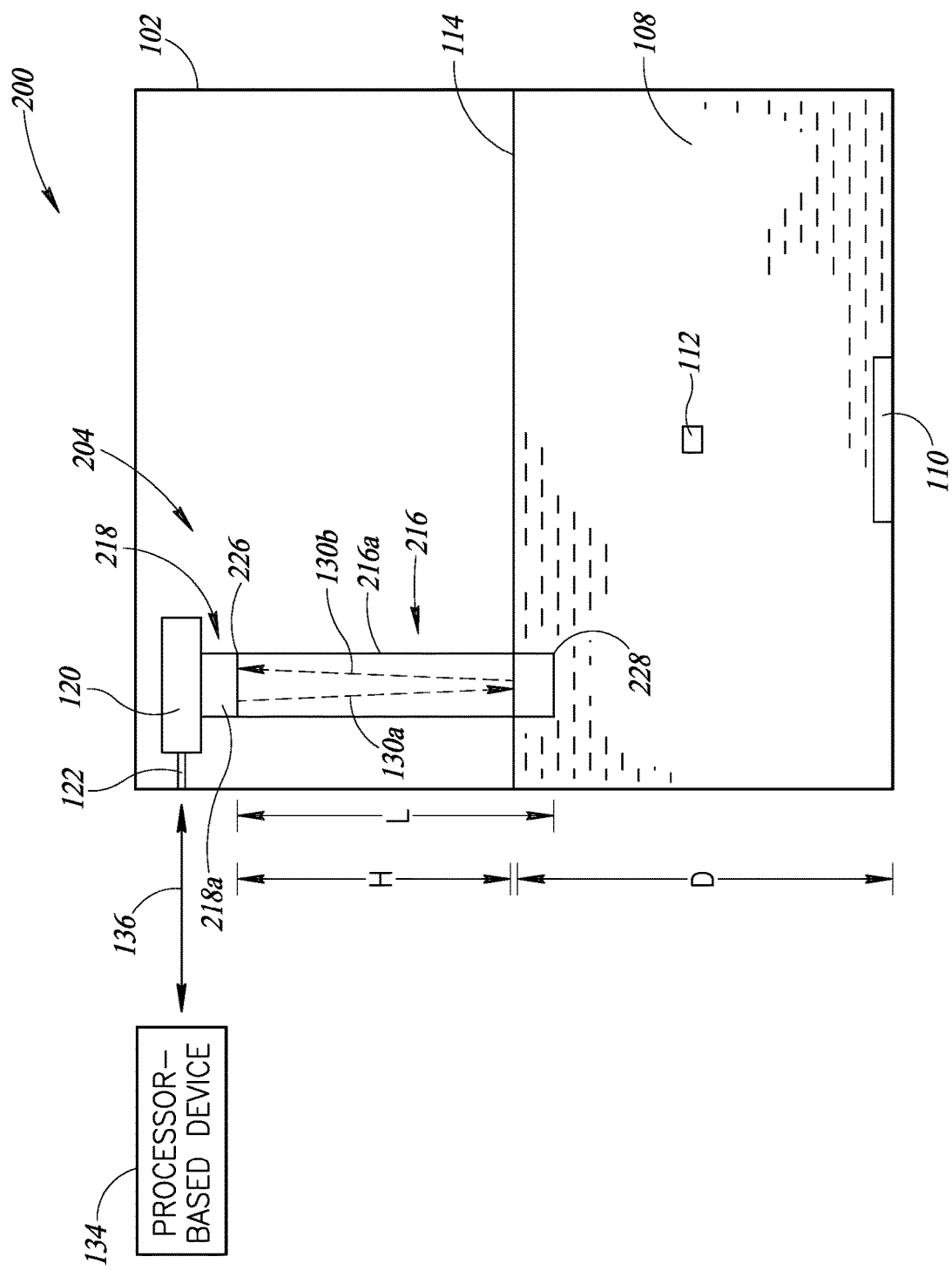
FIG. 3 is an elevational view of another sensor calibration system that includes a calibration bath container and an acoustic liquid level sensor that includes a single transmit/receive transducer, according to one illustrated implementation.
Figure 4:
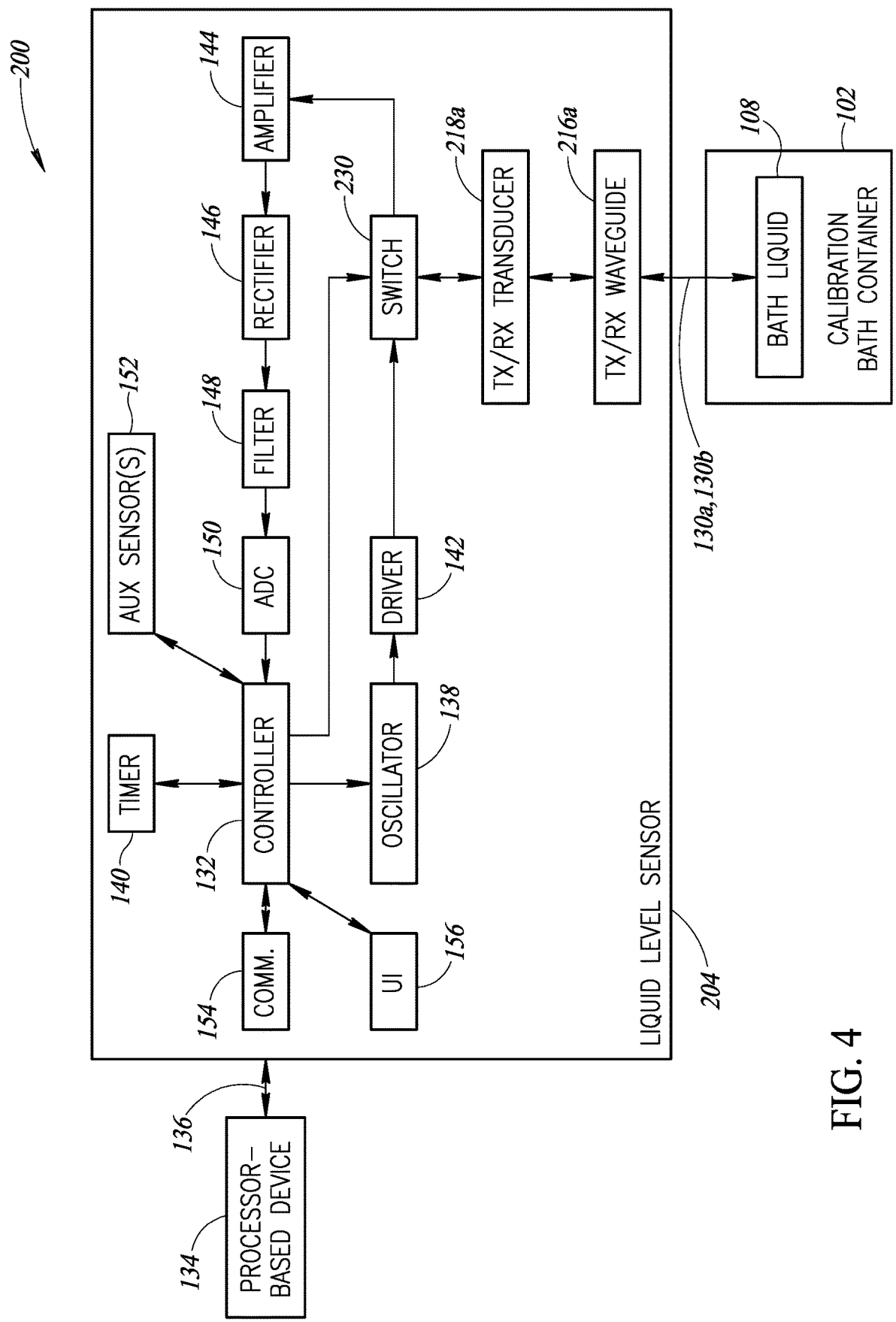
FIG. 4 is a schematic block diagram of the sensor calibration system of FIG. 3, according to one illustrated implementation.

FIGS. 3 and 4 illustrate another implementation of a sensor calibration system 200 according to the present disclosure. Many of the features of the sensor calibration system 200 are similar or identical to the sensor calibration system 100 of FIGS. 1 and 2 discussed above. As such, some or all of the discussion above relating to the sensor calibration system 100 also applies to the sensor calibration system 200.

The sensor calibration system 200 includes a liquid level sensor 204 that utilizes an acoustic transducer subsystem 218 that includes a single transmit/receive (TX/RX) transducer 218a, and an acoustic waveguide subsystem 216 that includes a single waveguide or tube 216a. The waveguide 216a includes a first end 226 proximate the transducer 218a and a second end 228 opposite the first end. In at least some implementations, the liquid level sensor 204 may be positioned inside the calibration bath container 102 such that the second end 228 of the waveguide 216 is submerged in the liquid 108 below the surface 114 thereof for the intended range of levels of the liquid. Such feature prevents acoustic signals 130a and 130b from being dispersed throughout the container 102, which may improve the accuracy of the liquid level sensor 204. In at least some implementations, the liquid level sensor 204 may include separate receive and transmit transducers, rather than a single transmit/receive transducer, disposed proximate the first end 226 the single waveguide 216a.

As discussed further below with reference to FIG. 4, during operation, a switch 230 that is controlled by the controller 132 directs the flow of electronic signals to and from the transducer 218a so that transmit circuitry used during the transmit phase does not interfere with receive circuitry used during the receive phase.

Referring to the schematic block diagram of FIG. 4, the controller 132 turns on the oscillator 138 for a brief time during the transmit phase. The controller 132 also sets the switch 230 so that the driver 142 is connected to the transducer 218a and the amplifier 144 is disconnected from the transducer. At the same time, the controller 132 starts the timer 140 so the controller can measure the time of the echo, as discussed above. The oscillator 138 produces a short-duration, high-frequency electronic signal. The signal is amplified by the driver 142. The amplified signal flows through the switch 230 to the transducer 218a, which vibrates and produces a pulse of high frequency acoustic signals.

After the acoustic signals are emitted by the transducer 218a, and while the acoustic signals are traveling toward the liquid 108 or being reflected from the liquid, the controller 132 operates the switch 230 to disconnect the driver 142 from the transducer 218a and to connect the amplifier 114 to the transducer to initiate the receive phase. The emitted acoustic signals 130a are channeled toward the surface of the liquid 108 through the waveguide 216a connected to the transducer 218a. Inside the waveguide 216a the emitted acoustic signals reflect off of the surface of the liquid 108 and reflected signals travel back through the waveguide to the transducer 218a. The reflected acoustic signals vibrate the transducer 218a, producing an electrical signal. The electrical signal is conditioned by the amplifier circuit 144, the rectifier circuit 146, and the filter circuit 148, as discussed above. The conditioned signal is converted to a digital signal by the ADC 150, which digital signal is received by the controller 132. As discussed above, the controller 132 analyzes the received digital signal and timing information from the timer 140 to determine a liquid parameter (e.g., surface level, depth, volume) of the liquid 108 in the calibration bath container.

In order for the transducer 218a to detect the reflected acoustic signals without interference, it may be advantageous for the transducer to stop vibrating before the reflected acoustic signals arrive at the transducer from the surface of the liquid 108. This goal may be achieved using one or more of several methods. As a first example, the duration of the oscillating signal may be designed to be relatively short compared to the time required for the signals to travel to the surface of the liquid 108 and return. For example, in at least some implementations, the oscillating signal comprises a few cycles (e.g., 4 cycles, 8 cycles, 16 cycles) of a 40 kHz signal, which has a duration of approximately 0.2 ms.

Figure 5:
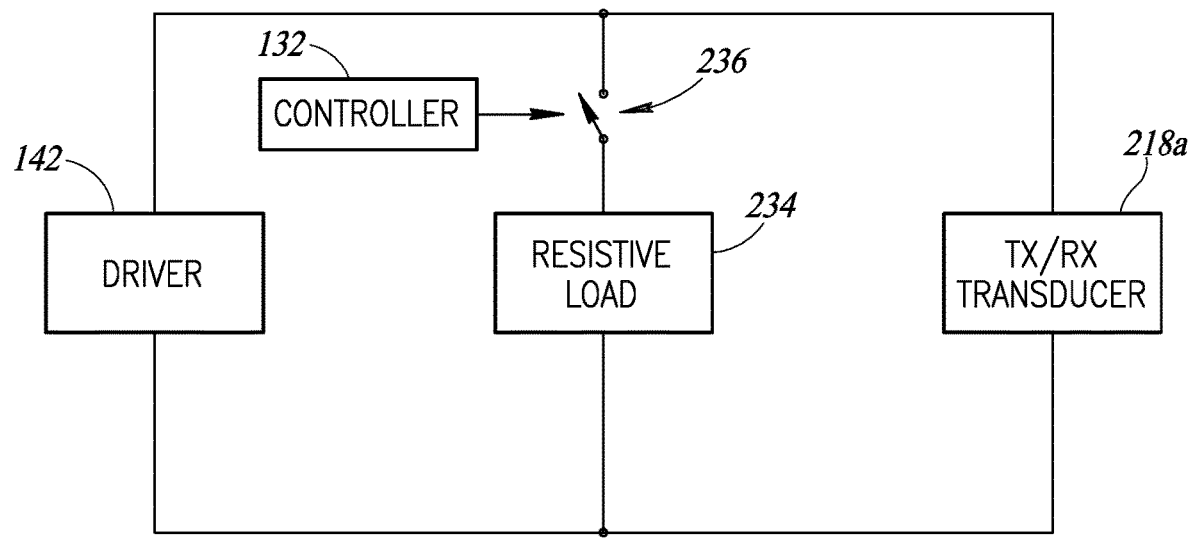
FIG. 5 is a schematic block diagram of a portion of an acoustic liquid level sensor, showing a resistive load selectively coupled in parallel with a transmit/receive transducer of the acoustic liquid level sensor, according to one illustrated implementation.

FIG. 5 illustrates another method that may be used to actively dampen the transducer 218a after transmission and prior to reception. In this illustrated implementation, a resistive load 234 (e.g., resistor) is electrically coupled in parallel with the transducer 218a. The resistive load 234 functions to dampen the vibration of the transducer 218a after the transducer transmits the pulse signal. In some embodiments, the resistive load 234 is continuously electrically coupled with the transducer 218a. In other implementations, the connection of the resistive load 234 to the transducer 218a may be selectively controlled by a switch 236 that is controlled by the controller 132 or other circuitry. In such implementations, the resistive load 234 may be disconnected from the transducer 218a when the transducer is transmitting the pulse signal. Then, after the transducer 218a has transmitted the pulse signal, the switch 236 may be closed by the controller 132 for a brief duration of time between the transmit phase and the receive phase to connect the resistive load 234 to the transducer. The switch 236 may then be opened by the controller 132 prior to the expected time when the reflected acoustic signals will arrive at the transducer 218a such that the resistive load 234 is again disconnected from the transducer 218a when the reflected signals arrive at the transducer.

Another method that may be utilized to actively dampen the vibration of the transducer 218a includes driving the transducer with a brief "dampening" pulse signal that has the same frequency as the initial pulse but is out of phase (e.g., 180° out of phase) with the initial pulse. Such out of phase signal helps cause the transducer to cease vibrating. Continuing with the above example, if the initial pulse is 8 cycles of a 40 kHz sine wave, the "dampening" pulse signal delivered to the transducer may be a pulse that is 4 cycles of a 40 kHz sine wave having a relative phase of 180 degrees from the initial pulse delivered to the transducer during the transmit phase, for example. In at least some implementations, one or more (e.g., all) of the aforementioned techniques may be utilized to cause the transducer 218a to stop vibrating between the transmit phase and the receive phase.

Figure 6:
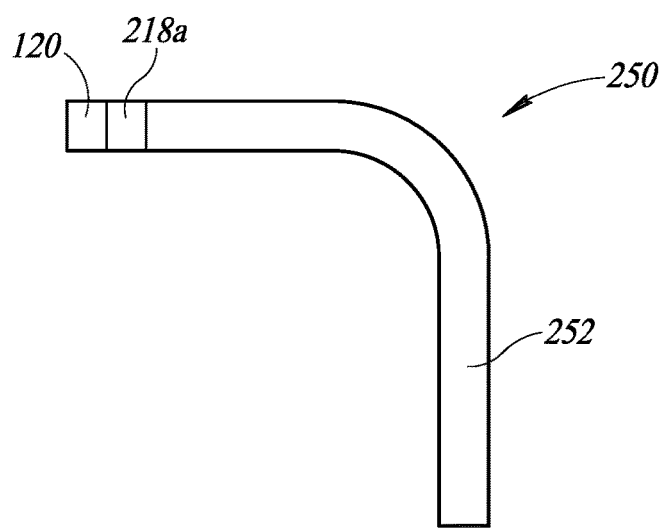
FIG. 6 is an elevational view of an example liquid level sensor that includes an acoustic waveguide formed into an "L" shape, according to one illustrated implementation.
Figure 7:
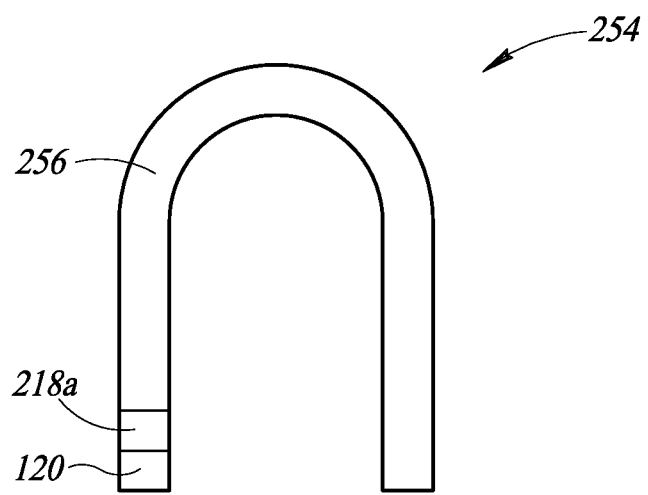
FIG. 7 is an elevational view of an example liquid level sensor that includes an acoustic waveguide formed into a "U" shape, according to one illustrated implementation.
Figure 8:
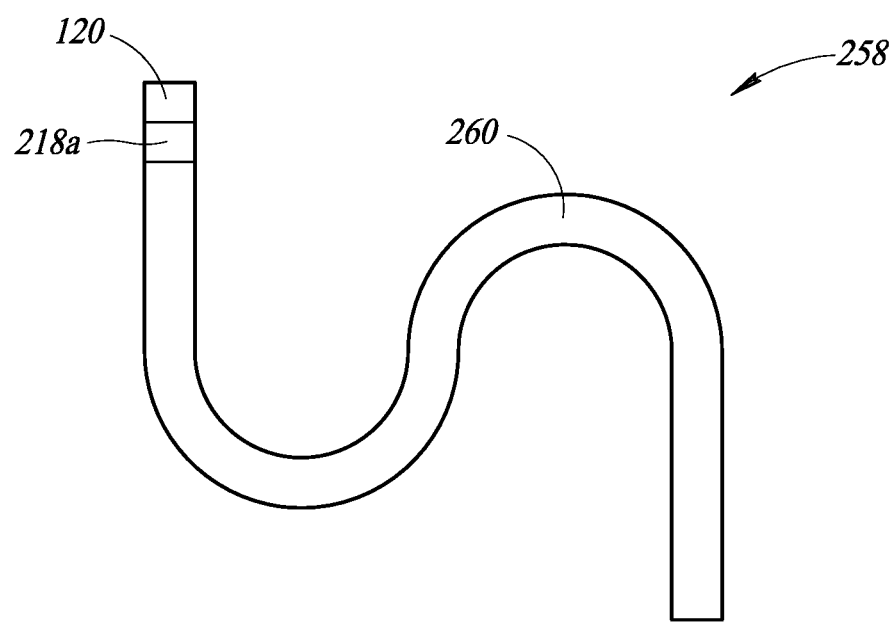
FIG. 8 is an elevational view of an example liquid level sensor that includes an acoustic waveguide formed into an "S" shape, according to one illustrated implementation.

FIGS. 6-8 show various implementations of liquid level sensors, illustrating non-limiting examples of various shapes that may be used for the waveguide subsystem (e.g., acoustic waveguide subsystem 116, 216). The examples shown in FIGS. 6-8 show waveguide subsystems that utilize a single waveguide (see FIGS. 3 and 4), but it should be appreciated that similar shapes may be used for implementations that utilize separate transmit and return waveguides (see FIGS. 1 and 2).

FIG. 6 shows a liquid level sensor 250 that includes an acoustic waveguide 252 formed into an "L" shape. FIG. 7 shows a liquid level sensor 254 that includes an acoustic waveguide 256 formed into a "U" shape. FIG. 8 shows a liquid level sensor 258 that includes an acoustic waveguide 260 formed into an "S" shape. In at least some implementations, the acoustic waveguides 252, 256, 260 may be formed of a rigid material (e.g., stainless steel). In at least some implementations, the acoustic waveguides 252, 256, 260 may be formed of a pliable or flexible material, such that the waveguides may be shaped by an operator to a suitable shape for a particular application.

FIG. 9 is an elevational view of a sensor calibration system 300 that includes a calibration bath container 102 and an acoustic liquid level sensor 301. The liquid level sensor 301 includes a waveguide 302 having a first end 302a and a second end 302b opposite the first end. In this illustrated implementation, the first end 302a of the waveguide extends outside of the calibration bath container 102 when the liquid level sensor 301 is positioned for measurement of the one or more liquid parameters of the liquid 108 in the container 102. Thus, the acoustic transducer 218a positioned proximate the first end 302a of the waveguide 302 is also positioned outside of the container 102, where it may be less affected by heat, vapor, etc. Further, the housing 120 which includes various components (e.g., controller 132, communications interface 154, user interface 156, etc.) may be physically separated from the transducer 218a by a distance and communicatively coupled to the transducer via a length of wire 304 or other suitable connection (e.g., one or more wires, wireless connection). Thus, in this implementation, the transducer 218a and the components in the housing 120 are further protected from heat, vapor, etc., from the liquid 108 in the container 102.

The controller 132 may be any of a number of types of devices, such as a computer, microprocessor, microcontroller, field programmable gate array (FPGA), application specific integrated circuit (ASIC), or system of discrete components, that is capable of performing the functionality discussed herein. Additionally, some components, such as the timer 140, oscillator circuit 138, driver circuit 142, and amplifier circuit 144, may be separate components, subcircuits, or may be built-in functions of the controller 132. In at least some implementations, one or more of the components may be combined or omitted, or the liquid level sensor may include additional components.

For example, some components, such as the ADC 150 or the rectifier circuit 146, may not be required depending on the particular objectives and required precision. As an example, a circuit may simply produce a logic transition when the amplitude of a signal from the receive transducer (e.g., RX transducer 118b, transducer 218a) reaches a certain threshold. Such logic transition would be indicative of receipt of the echo signal, and may be used with a time stamp to determine the elapsed time of travel for the acoustic signal which, as discussed above, may be used to determine one or more parameters associated with the liquid 108 in the container 102.

In at least some implementations, the controller 132 may not calculate the actual distance between the liquid level sensor and the surface of the liquid. For example, the controller 132 may decide whether the liquid level is acceptable simply based on whether the echo is detected within a window of time. The window of time may be selectively adjustable by a user to suit a particular application (e.g., particular size container). Further, although the pulse signal has been described as being a number (e.g., 4, 8, 12) of cycles of a 40 kHz sine wave in one or more example implementations, pulses having other frequencies (e.g., 200 Hz-100 kHz), shapes (e.g., triangle wave, square wave), and durations (e.g., 0.01 ms, 0.1 ms, 1.0 ms) may be used.

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via Application Specific Integrated Circuits (ASICs). However, those skilled in the art will recognize that the implementations disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative implementation applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory.

The various implementations described above can be combined to provide further implementations. These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A liquid level sensor positionable with respect to a calibration bath container that holds a quantity of a liquid, the calibration bath container comprising a controllable heater, and the liquid level sensor comprising:
   an acoustic waveguide subsystem comprising a sidewall that forms at least one elongated channel between a first end and a second end, the second end comprising at least one opening that faces toward the liquid in the calibration bath container;
   an acoustic transducer subsystem disposed proximate the first end of the acoustic waveguide subsystem, the acoustic transducer subsystem operative to transmit and detect acoustic signals via the acoustic waveguide subsystem;
   at least one nontransitory processor-readable storage medium that stores at least one of processor-executable instructions or data; and
   at least one processor communicatively coupled to the acoustic transducer subsystem, the controllable heater, and the at least one nontransitory processor-readable storage medium, wherein in operation, the at least one processor:
      causes the acoustic transducer subsystem to transmit an acoustic signal;
      causes the acoustic transducer subsystem to detect a reflected acoustic signal, the reflected acoustic signal being reflected from a surface of the liquid in the calibration bath container;
      receives a signal representative of the reflected acoustic signal;
      determines a liquid parameter associated with an amount of the liquid in the calibration bath container based at least in part on a characteristic of the reflected acoustic signal;
      determines whether the liquid level of the liquid in the calibration bath container is outside a range of acceptable liquid levels based on the determined liquid parameter; and
      responsive to a determination that the liquid level is outside the range of acceptable liquid levels, modifies the operation of the controllable heater of the calibration bath container.

2. The liquid level sensor of claim 1 wherein the acoustic waveguide subsystem comprises a single waveguide, and the acoustic transducer subsystem comprises a transmit/receive transducer disposed proximate the first end of the acoustic waveguide subsystem, wherein in operation the transmit/receive transducer transmits and detects acoustic signals via the waveguide.

3. The liquid level sensor of claim 2, further comprising:
   a switch operatively coupled to the transmit/receive transducer, wherein in operation the switch alternatively couples the transmit/receive transducer to transmit circuitry or receive circuitry of the liquid level sensor, and wherein, in operation, the at least one processor controls the switch to couple the transmit/receive transducer to the transmit circuitry during a transmit phase in which the transmit/receive transducer transmits acoustic signals, and controls the switch to couple the transmit/receive transducer to the receive circuitry during a receive phase in which the transmit/receive transducer receives acoustic signals.

4. The liquid level sensor of claim 3, further comprising a resistive load continuously or selectively coupled to the transmit/receive transducer.

5. The liquid level sensor of claim 3 wherein, in operation, the at least one processor causes delivery of a dampening pulse signal to the transmit/receive transducer between the transmit phase and the receive phase, the dampening pulse signal being out of phase with the pulse signal delivered to the transmit/receive transducer during the transmit phase.

6. The liquid level sensor of claim 2 wherein the second end of the acoustic waveguide subsystem is submerged in the liquid in the calibration bath container when the liquid is within an intended range of levels.

7. The liquid level sensor of claim 1 wherein the second end of the acoustic waveguide subsystem is spaced apart from the liquid in the calibration bath container by between 1 centimeter and 50 centimeters when the liquid is within an intended range of levels.

8. The liquid level sensor of claim 1 wherein the acoustic waveguide subsystem comprises a transmit waveguide and a receive waveguide, each of the transmit waveguide and receive waveguide comprising respective first and second ends, the second ends each comprising an opening that faces toward the liquid in the calibration bath container, and the acoustic transducer subsystem comprises a transmit transducer and a receive transducer, the transmit transducer disposed proximate the first end of the transmit waveguide, and the receive transducer disposed proximate the first end of the receive waveguide.

9. The liquid level sensor of claim 8 wherein the transmit waveguide and the receive waveguide are positioned substantially adjacent one another.

10. The liquid level sensor of claim 1 wherein the at least one elongated channel of the acoustic waveguide subsystem has at least one curved portion.

11. The liquid level sensor of claim 1 wherein the acoustic waveguide subsystem is formed from at least one of stainless steel, titanium, or polyvinyl chloride.

12. The liquid level sensor of claim 1 wherein the at least one elongated channel of the acoustic waveguide subsystem has a length that is between 5 centimeters and 25 centimeters.

13. The liquid level sensor of claim 1 wherein the elongated channel has a cross-sectional area that is between 15 square millimeters and 150 square millimeters.

14. The liquid level sensor of claim 1 wherein the transmitted acoustic signal results from a driving pulse signal comprising a number of cycles of at least one of a square wave, a triangle wave, or a sine wave.

15. The liquid level sensor of claim 1 wherein the liquid parameter comprises at least one of: a depth of the liquid in the calibration bath container, a volume of the liquid in the calibration bath container, or a distance between the liquid level sensor and the surface of the liquid in the calibration bath container.

16. The liquid level sensor of claim 1 wherein the characteristic of the reflected acoustic signal comprises an elapsed travel time between when the acoustic signal is transmitted and when the reflected acoustic signal is detected.

17. The liquid level sensor of claim 1, further comprising: an auxiliary sensor operatively coupled to the at least one processor, wherein in operation, the at least one processor receives an auxiliary sensor signal from the auxiliary sensor and determines the liquid parameter based at least in part on the received auxiliary sensor signal.

18. The liquid level sensor of claim 17 wherein the auxiliary sensor comprises at least one of a temperature sensor or a pressure sensor.

19. The liquid level sensor of claim 1, further comprising: a user interface operatively coupled to the at least one processor, wherein in operation, the at least one processor causes the user interface to provide an indication associated with the determined liquid parameter, wherein, responsive to a determination that the liquid level is outside the range of acceptable liquid levels, the at least one processor causes at least one notification that the liquid level is outside the range of acceptable liquid levels to be provided via the user interface.

20. The liquid level sensor of claim 1, further comprising:
a communications interface operatively coupled to the at least one processor, wherein in operation, the at least one processor causes the communications interface to send information associated with the determined liquid parameter to a separate processor-based device,
wherein, responsive to a determination that the liquid level is outside the range of acceptable liquid levels, the at least one processor causes at least one notification that the liquid level is outside the range of acceptable liquid levels to be provided via the communications interface.

21. The liquid level sensor of claim 1 wherein at least a portion of the sidewall of the acoustic waveguide subsystem is positionable outside of the calibration bath container during use.

22. The liquid level sensor of claim 1 wherein the at least one processor is positionable outside of the calibration bath container during use.

23. The liquid level sensor of claim 1 wherein the acoustic transducer subsystem is positionable outside of the calibration bath container during use.

24. A sensor calibration system, comprising:
a calibration bath container sized and dimensioned to hold a quantity of a liquid, the calibration bath container comprising a controllable heater;
a liquid level sensor positionable with respect to the calibration bath container, the liquid level sensor comprising:
an acoustic waveguide subsystem comprising a sidewall that forms at least one elongated channel between a first end and a second end, the second end comprising at least one opening that faces toward the liquid in the calibration bath container;
an acoustic transducer subsystem disposed proximate the first end of the acoustic waveguide subsystem, the acoustic transducer subsystem operative to transmit and detect acoustic signals via the acoustic waveguide subsystem;
control circuitry communicatively coupled to the acoustic transducer subsystem and the controllable heater that, in operation:
causes the acoustic transducer subsystem to transmit an acoustic signal;
causes the acoustic transducer subsystem to detect a reflected acoustic signal, the reflected acoustic signal reflected from a surface of the liquid in the calibration bath container;
receives a signal representative of the reflected acoustic signal;
determines a liquid parameter associated with an amount of the liquid in the calibration bath container based at least in part on a characteristic of the reflected acoustic signal;
determines whether the liquid level of the liquid in the calibration bath container is outside a range of acceptable liquid levels based on the determined liquid parameter; and
responsive to a determination that the liquid level is outside the range of acceptable liquid levels, modifies the operation of the controllable heater of the calibration bath container.

25. A method of operating a sensor calibration system, the method comprising:

positioning a liquid level sensor proximate a calibration bath container that holds a quantity of a liquid, the calibration bath container comprising a controllable heater, and the liquid level sensor comprising:

an acoustic waveguide subsystem comprising a sidewall that forms at least one elongated channel between a first end and a second end, the second end comprising at least one opening that faces toward the liquid in the calibration bath container; and an acoustic transducer subsystem disposed proximate the first end of the acoustic waveguide subsystem, the acoustic transducer subsystem operative to transmit and detect acoustic signals via the acoustic waveguide subsystem;

causing, by at least one processor, the acoustic transducer subsystem to transmit an acoustic signal;

causing, by the at least one processor, the acoustic transducer subsystem to detect a reflected acoustic signal, the reflected acoustic signal reflected from a surface of the liquid in the calibration bath container;

receiving, by the at least one processor, a signal representative of the reflected acoustic signal;

determining, by the at least one processor, a liquid parameter associated with an amount of the liquid in the calibration bath container based at least in part on a characteristic of the reflected acoustic signal;

determining, by the at least one processor, whether the liquid level of the liquid in the calibration bath container is outside a range of acceptable liquid levels based on the determined liquid parameter; and responsive to determining that the liquid level is outside the range of acceptable liquid levels, modifying, by the at least one processor, the operation of the controllable heater of the calibration bath container.

\* \* \* \* \*